United States Patent [19]
Ushida

[11] Patent Number: 6,084,686
[45] Date of Patent: Jul. 4, 2000

[54] BUFFER MEMORY CONTROL DEVICE AND CONTROL METHOD, AND AN IMAGE PROCESSING DEVICE AND METHOD USING THE SAME

[75] Inventor: Katsutoshi Ushida, Kawasaki, Japan

[73] Assignee: Canon Kabushiki Kaisha, Tokyo, Japan

[21] Appl. No.: 08/976,235

[22] Filed: Nov. 21, 1997

[30] Foreign Application Priority Data

Nov. 26, 1996 [JP] Japan .................................. 8-329094

[51] Int. Cl.[7] .................................................. G06K 15/00
[52] U.S. Cl. ........................................ 358/1.16; 358/1.1
[58] Field of Search .................................. 358/524, 404, 358/444, 448, 468, 523, 1.1, 1.6, 1.11, 1.15, 1.16, 1.17, 1.18; 382/307; 395/101, 111, 114–119, 106, 872, 876; 364/130, 131, 133, 134, 138; 345/196, 512, 507, 501, 520; 711/100, 101, 147, 170, 171, 172; 710/52, 56

[56] References Cited

U.S. PATENT DOCUMENTS

| | | | |
|---|---|---|---|
| 5,163,123 | 11/1992 | Kadono | 395/116 |
| 5,659,670 | 8/1997 | AuClair | 395/115 |
| 5,727,136 | 3/1998 | Kubota | 395/114 |

*Primary Examiner*—Arthur G. Evans
*Attorney, Agent, or Firm*—Fitzpatrick, Cella, Harper & Scinto

[57] ABSTRACT

A buffer memory control device has a plurality of generating units which generate image data of differing formats one line at a time. A storage unit temporarily stores at least one line of image data generated by one of the generating units. A plurality of processing units perform differing image processing of at least one line of image data read from the storage unit. A control unit controls the number of lines of image data to be temporarily stored in the storage unit and the amount of data per line, based on the generating unit which generates the image data stored in the storage unit and the processing unit which performs image processing of the image data read from the storage unit.

38 Claims, 9 Drawing Sheets

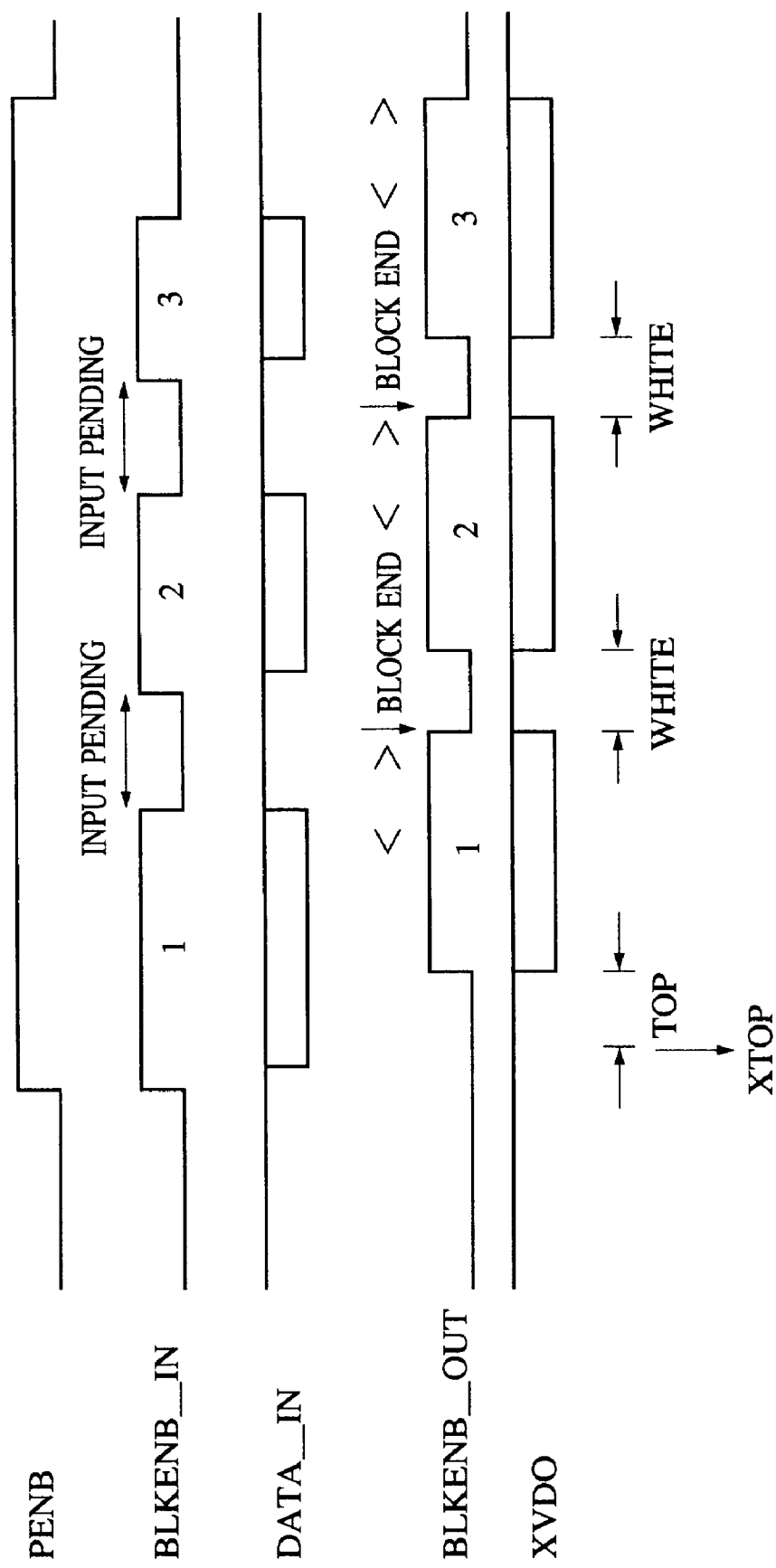

BUFFER MEMORY CONTROL DEVICE AND CONTROL METHOD, AND AN IMAGE PROCESSING DEVICE AND METHOD USING THE SAME

BACKGROUND OF THE INVENTION

1. Field of the Invention

The present invention relates to a buffer memory device which temporarily stores input image data and outputs the stored image data to an image processing unit, and to a method for controlling the buffer memory device. Particularly, the present invention relates to a buffer memory control device which temporarily stores image data input from one of a plurality of input sources and which supplies the stored image data to one of a plurality of image processing units, and to a method for controlling the buffer memory control device, and to an image processing device and method using the buffer memory control device and control method.

2. Description of Related Art

Generally, with recording apparatuses such as laser beam printers (LBP), the image data must be continuously output to the engine at a unique image transfer speed determined according to the number of faces of the polygonal mirror used for scanning and the rotation speed thereof, while synchronizing with horizontal and vertical synchro signals. Thus, with digital copiers or the like, for example, in the event that the image transfer clock of the scanning unit is not the same as the image transfer clock used to control data transfer to the engine, a method is employed wherein two line buffer memories are used to perform conversion of the speed of the image transfer clock. Specifically, each line buffer memory is accessed at the time of memory writing of the image data output from the scanner unit, and also at the time of memory reading of the image data to be supplied to the printer engine, and the two line buffer memories are used as a speed absorption buffer to perform conversion of the speed of the image transfer clock. Also, with digital copier devices, conversion processing for converting the image data into on/off signals for the laser beam is performed at the latter tier of the aforementioned line buffer memories, as recording image processing for forming the image on paper.

Similarly, two line buffer memories are used to perform conversion of the speed of the image transfer clock with communication equipment such as facsimile apparatuses as well, since the image supplying speed of the decoder is not constant during the process of decoding the encoded image data with a decoder and recording this image. Also, since the recording resolution of the printer engine and the resolution of the image data in the image file are not the same with facsimile apparatuses, resolution conversion processing is performed at the latter tier of the aforementioned line buffer memories, as necessary. Regarding this resolution conversion processing, reference buffer memories are provided separately, to enable image processing for outline smoothing of slanted lines.

In recent years, apparatuses have been developed with complex functions, including, e.g., photocopying functions, facsimile functions, and printer functions. Such complex devices are constructed so as to output various types of image data having differing resolution and depth from a single printer engine. With complex apparatuses constructed thus, a speed absorption line buffer memory is used for transfer speed conversion for each image supplying device such as the scanner unit supplying image data to the printer engine, and there also are provided line reference buffer memories separately for each different function image process, such as resolution conversion and binarization processing.

Hence, the number of buffer memory chips used in such complex apparatus with a complex structure of photocopying functions, facsimile functions, and printer functions, increases according to the number of functions provided therein, and thus the construction of the apparatus tends to become complicated.

SUMMARY OF THE INVENTION

The present invention has been made in light of the above-described points, and accordingly, it is an object of the present invention to provide a simple buffer memory control device and control method, and an image processing device and method using the same, wherein increased capabilities of functions of the apparatus or complex functions therein will not cause the apparatus to become more complicated than necessary.

It is another object of the present invention to provide a buffer control device and buffer memory control method which is capable of preventing the construction of an apparatus from becoming complicated due to complex functions such as photocopying functions, facsimile functions, and printer functions.

According to an aspect of the present invention, a buffer memory control device comprises: input means for input of image data one line at a time; storage means for temporarily storing a plurality of lines of image data input from the input means; output means for performing parallel output of a plurality of lines of image data read from the storage means; and control means for controlling writing image data to the storage means and/or reading therefrom, in response to a request to write image data from the input means to the storage means and/or a request to read image data from the output means.

According to another aspect of the present invention, a buffer memory control device comprises: input means for selectively inputting image data generated by a plurality of data sources one line at a time; storage means for temporarily storing at least one line of image data input from the input means; output means for selectively outputting the image data read from the storage means to one of a plurality of image processing units; and control means for controlling the number of lines of the image data to be temporarily stored in the storage means and the amount of data per line, based on the format of the image data input from the input means and the format of the image data output from the output means.

Also, according to a further aspect of the present invention, an image processing device comprises: generating means for generating data one line at a time; storage means for temporarily storing a plurality of lines of image data generated by the generating means; processing means for performing image processing of a plurality of lines of image data read from the storage means; and control means for controlling writing image data to the storage means and/or reading therefrom, in response to a request to write image data from the side of the generating means to the storage means and/or a request to read image data from the side of the generating means.

Further, according to yet another aspect of the present invention, an image processing device comprises: a plurality of generating means for generating data of differing formats one line at a time; storage means for temporarily storing at least one line of image data generated by one of the generating means; a plurality of processing means for performing image processing of at least one line of image data read from the storage means; and control means for controlling the number of lines of the image data to be temporarily stored in the storage means and the amount of data per line, based on the generating means which has generated the image data to be stored in the storage means and the processing means for performing image processing of image data read from the storage means.

These and other objects and advantages of the present invention will become apparent from the following description.

BRIEF DESCRIPTION OF THE DRAWINGS

FIG. 9 is a timing chart illustrating the switch-over timing regarding the input/output of the three image blocks in the image being output in FIG. 8.

DESCRIPTION OF THE PREFERRED EMBODIMENT

Now, description will be made regarding an embodiment of the present invention, with reference to the drawings.

Figure 1:
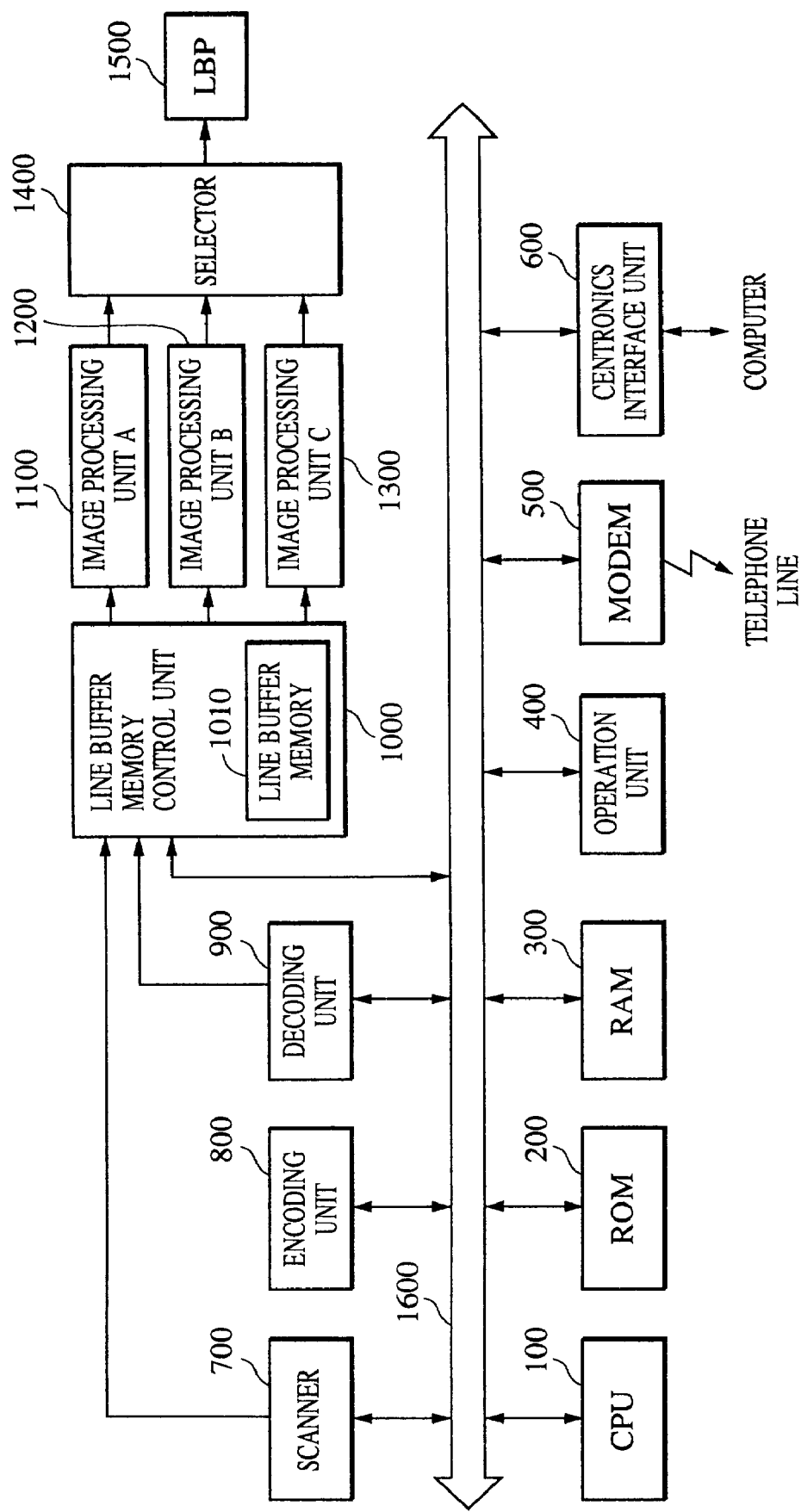
FIG. 1 is a block diagram illustrating the construction of a copier/facsimile apparatus mounted with an embodiment of the buffer memory control device according to the present invention.

FIG. 1 is a block diagram illustrating the construction of a copier/facsimile apparatus mounted with an embodiment of the buffer memory control device according to the present invention. As shown in the FIG. 1, the copier/facsimile apparatus is comprised of a CPU 100 which controls the overall apparatus so as to perform the copying functions and facsimile functions based on control data stored in the ROM 200 and also font data provided therein, and RAM 300 used as a work area for temporarily storing the results of computation and processing by the CPU 100 and also as an image file storage area for storing image data.

The image data to be stored in the image file storage area of the RAM 300 is: encoded image data received with the modem 500, image data input from a computer via the centronics interface unit (hereafter referred to as "centronics I/F unit") 600, and image data read by the scanner 700 and encoded at the encoding unit 800.

The modem 500 performs demodulation of the data in order to perform transmitting and receiving of data via telephone lines. Transmitting and receiving of data which has been encoded by MH, MR, MMR, and the like is conducted via this modem 500.

The centronics I/F unit 600 performs reception of image data from the computer connected to the apparatus, and sending image data to the computer which has been read by the scanner 700 or received by the modem 500.

The scanner 700 reads an original image, and the image data obtained by means of this reading is output as a digital image having a number n of bits per pixel. Regarding this scanner 700, the reading resolution and the depth of data (the number of bits per pixel) can be changed within a certain range. For example, in the event that an original image is to be sent from the modem 500 to another G3 facsimile apparatus via telephone lines, the original image is read as a binary image (1 bit per pixel) at 203.2 dpi by 97.9 dpi, or 203.2 dpi by 195.58 dpi. Conversely, since the resolution is to be optimally employed when performing photocopying, the original image is read as a quaternary image (2 bits per pixel) at 400 dpi by 600 dpi when in the copying mode.

The encoding unit 800 encodes binary data from the scanner 700 using image compressing methods such as MH, MR, MMR, and the like. This encoded image data is transferred to the RAM 300 via an internal bus 1600, and is temporarily stored in the image file storage area of the RAM 300.

The encoded image data stored in the image file storage area of the RAM 300 is read, and is transferred to the decoding unit 900 via the internal bus 1600. The decoding unit 900 decodes image data read form the RAM 300, and the decoded image data is output to the line buffer memory control unit 1000.

The line buffer memory control unit 1000 receives output of image data from the scanner 700 and image data read directly from the RAM 300, in addition to the image data from the decoding unit 900. The input speed of the image data from the various devices, i.e., the decoding unit 900, scanner 700, and RAM 300, each are different one from another, and the image data is temporarily stored in the line buffer memory 1010 one line at a time. The image data stored in the line buffer memory 1010 is supplied to either the image processing unit A 1100, image processing unit B 1200, or image processing unit C 1300, while being synchronized with synchronous signals from the laser beam printer (hereafter referred to as "LBP") which comprises the printer engine. The data for the number of reference lines necessary for each image processing unit can be simultaneously provided upon supplying of the image data to the image processing unit A 1100, image processing unit B 1200, or image processing unit C 1300. The line buffer memory control unit 1000 will be described in detail later.

The image processing unit A 1100 conducts image processing of the copying functions, and performs conversion of the quaternary image data of 400 dpi by 600 dpi output from the scanner 700, into laser driver on/off signals for the laser driver of the LBP 1500 in units of 1200 dpi, using known interpolation processing. This processing does not need reference to the image data in the sub-scanning direction.

The image processing unit B 1200 conducts outline smoothing processing using a known smoothing filter for interpolating the outline of characters smoothly when recording image data, input from the computer via the centronics I/F unit 600 or low-resolution (e.g., 200 dpi)

image data received by the modem 500, with the LBP 1500. In this processing, reference to 9 lines of image data in the sub-scanning direction is needed.

The image processing unit 1300 subjects the pseudo-halftone image data (resolution of e.g., 400 dpi) which has been taken in via the centronics I/F unit 600 or modem 500 to size variation and recording of the image data. The size variation processing is performed using a known projection method, while maintaining the gradation. In this processing, reference to 2 lines of image data in the sub-scanning direction is needed. Details of the processing performed by the A 1100, image processing unit B 1200, and image processing unit C 1300 will be omitted from description here.

The image data processed by the A 1100, image processing unit B 1200, or image processing unit C 1300 is supplied to the LBP 1500 via the selector 1400. The LBP 1500, as described above, is comprised of a laser beam printer, description of the construction thereof being omitted here.

Sending commands to the CPU 100 and setting modes is performed by input operation with the operating unit 400. The operating unit 400 is comprised of an LCD and LED display unit and key input unit (not shown), and serves as an interface with the user. The input data from the user is transferred to the CPU 100 via the internal bus 1600.

Figure 2:
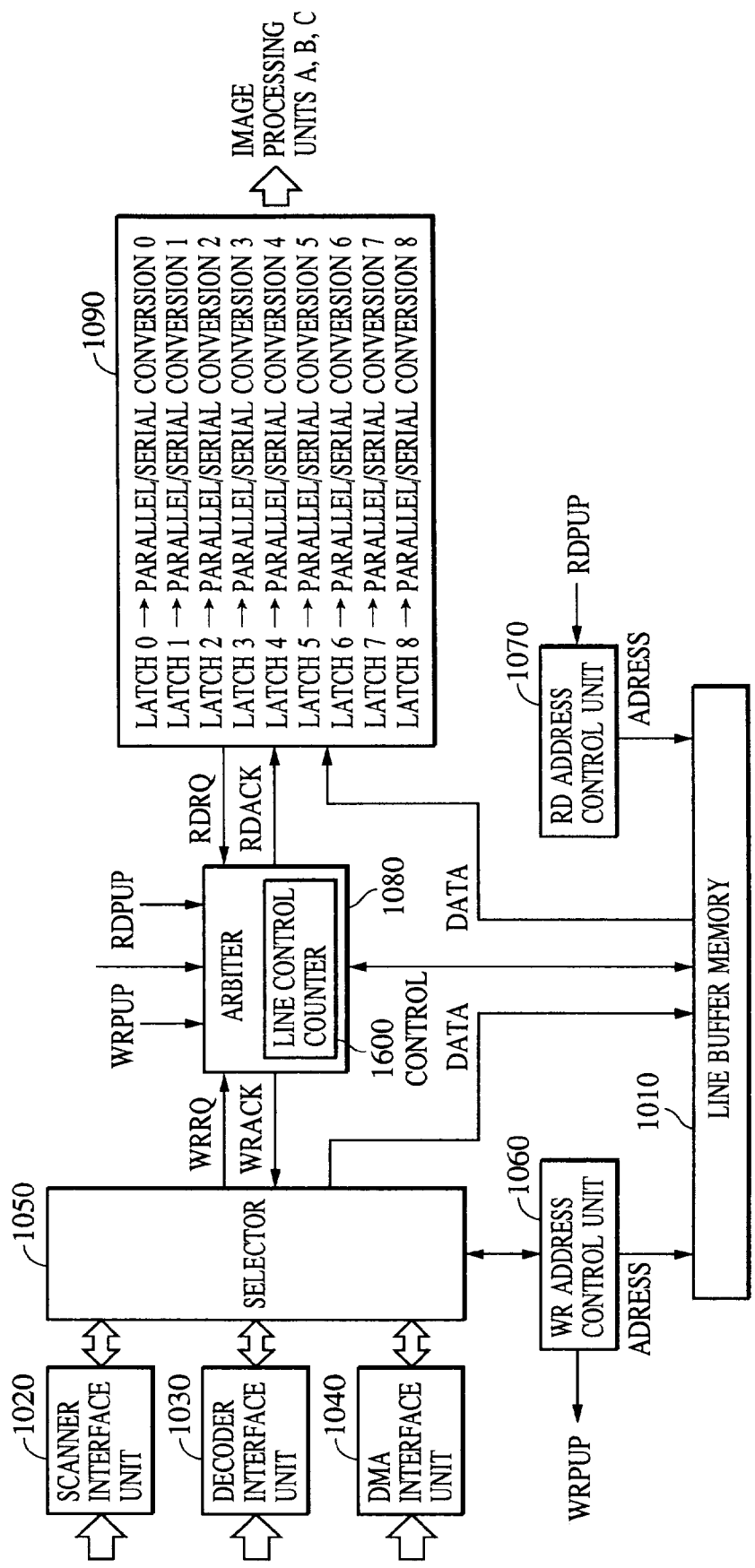
FIG. 2 is a block diagram illustrating the construction of the line buffer memory control unit mounted on the copier/facsimile apparatus shown in FIG. 1.
Figure 3C:
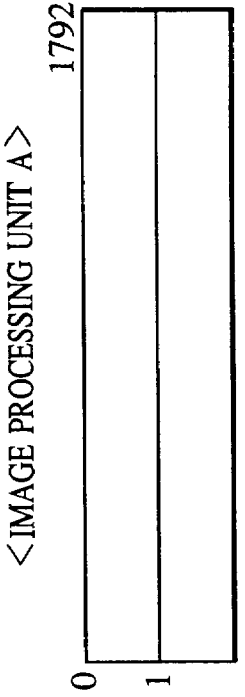
FIGS. 3A, 3B, and 3C are diagrams illustrating appropriation of the line buffer memory shown in FIG. 2 according to image processing.
Figure 3B:
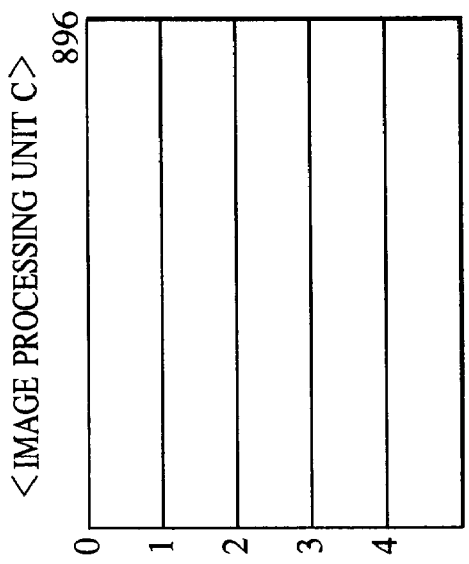
Figure 3A:
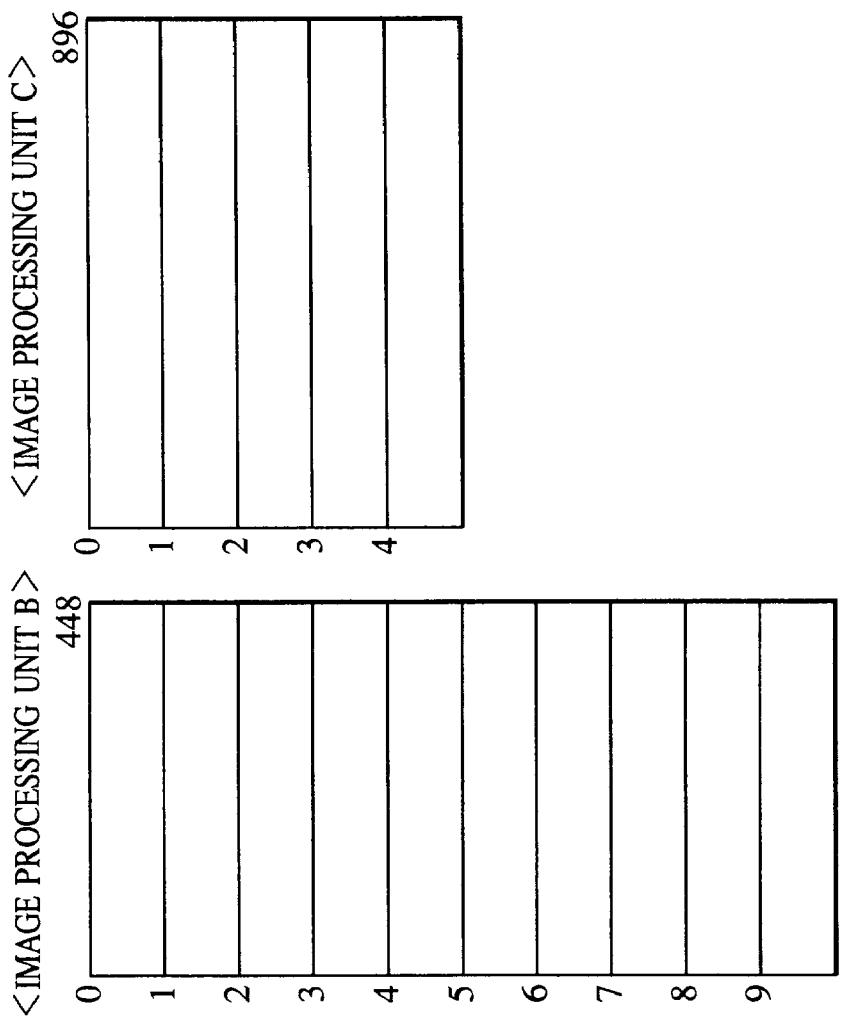

Next, description of will be made in detail of the line buffer memory control unit 1000, with reference to FIG. 2. FIG. 2 is a block diagram illustrating the construction of the line buffer memory control unit mounted on the copier/facsimile apparatus shown in FIG. 1, and FIG. 3 is a diagram illustrating appropriation of the line buffer memory shown in FIG. 2 according to image processing.

The line buffer memory control unit 1000 has a line buffer memory 1010 which is comprised of a 4480 word by 8 bit synchronous RAM, as shown in FIG. 2. Since the word width of the line buffer memory 1010 is 8 bits, access to the line buffer memory 1010 is performed in 8-bit units.

The line buffer memory 1010 is appropriated as a plurality of line buffers according to the image processing units A 1100, B 1200, and C 1300 (shown in FIG. 1), to which the read image data is to be output. Specifically, as shown in FIG. 3, in the event that the image processing unit A 1100 is selected, since the image processing unit A 1100 does not need reference to image data in the sub-scanning direction, the line buffer memory 1010 is appropriated as a two-line buffer memory with the length of each line of data being 1792 bytes, in order to operate as a two-line toggle buffer memory. In the event that the image processing unit B 1200 is selected, since the image processing unit B 1200 needs reference to 9 lines of image data in the sub-scanning direction, the line buffer memory 1010 is appropriated as a ten-line buffer memory (9 lines of reference lines and 1 line as a speed absorption line, for a total of 10 lines) with the length of each line of data being 448 bytes, in order to operate as a ten-line toggle buffer memory.

In the event that the image processing unit C 1300 is selected, since the image processing unit C 1300 needs reference to 2 lines of image data in the sub-scanning direction, the line buffer memory 1010 is appropriated as a five-line buffer memory (2 lines of reference lines and 3 lines as speed absorption lines, for a total of 5 lines) with the length of each line of data being 896 bytes, in order to operate as a five-line toggle buffer memory. Incidentally, the appropriation of the line buffer memory is not restricted to the above described arrangement; rather, according to the present embodiment, effective use of the line buffer 1010 is made as follows: since there is a tendency that an image of good quality can be obtained even if the number of reference lines is reduced, so long as the resolution is normal, appropriation of the line buffer memory 1010 is performed such that the number of reference lines is increased in the event of processing image data with resolution lower than normal resolution (i.e., an image wherein the data length per line is short), while the number of reference lines is decreased in the event of processing image data with higher than normal resolution.

The image data to be written to the line buffer memory 1010 is input from the various I/F units, i.e., the scanner I/F unit 1020, the decoder I/F unit 1030, and the DMA I/F unit 1040. The various I/F units, i.e., the scanner I/F unit 1020, the decoder I/F unit 1030, and the DMA I/F unit 1040, perform packing processing wherein the image data is packed in 8-bit units, by means of access to the line buffer memory 1010 being performed in 8-bit units as described above, i.e., writing being performed in units of 8 bits.

Specifically, image data of 2 bits per pixel having resolution of 400 dpi in the main scanning direction and resolution of 600 dpi in the sub-scanning direction is input to the scanner I/F unit 1020, synchronously with the image transfer clock from the scanner 700. At the scanner I/F unit 1020, a WRRQ signal which is a data storage request signal to the line buffer memory 1010 is issued to the selector 1050 each time packing is performed, and the image data packed by this WRRQ signal is stored in the line buffer memory 1010.

Binary data of 1 bit per pixel is serially input from the decoding unit 900 to the decoding unit I/F 1030 synchronously with the image data transfer clock, and the input image data is packed in 8-bit units. As with the case of the scanner I/F unit 1020, at the decoding unit I/F 1030 a WRRQ signal which is a data storage request signal to the line buffer memory 1010 is issued to the selector 1050 each time packing is performed, and the image data packed by this WRRQ signal is stored in the line buffer memory 1010.

Image data from the RAM 300 is input to the DMA I/F unit 1040, by direct memory access via the internal bus 1600. In the event that the image data is input via an internal bus 16 bits in width, packing is performed at the DMA I/F unit 1040 by dividing the input image data into 8-bit units, thus packing the data. As with the case of the scanner I/F unit 1020, at the DMA I/F unit 1040 a WRRQ signal which is a data storage request signal to the line buffer memory 1010 is issued to the selector 1050 each time packing is performed, and the image data packed by this WRRQ signal is stored in the line buffer memory 1010.

The selector 1050 selects one of the scanner I/F unit 1020, the decoder I/F unit 1030, and the DMA I/F unit 1040, according to the selection value for selecting the device from which to input the image data, i.e., from the scanner 700, decoding unit 900, and RAM 300. Then, the WRRQ signal is taken from the selected I/F unit and output to the arbiter unit 1080, and at the same time, the image data from the corresponding image data input device is selected, and output to the line buffer memory 1010.

Reading of the image data from the line buffer memory 1010 is performed in 8-bit units, the same as image data writing, and the image data read from the line buffer memory 1010 is converted into serial data at the latch parallel/serial converting unit 1090, and then subsequently output to the corresponding image processing unit. In order to temporarily maintain the image data read from the line buffer memory 1010, the latch parallel/serial converting unit 1090 has a latch group 0–8, and a parallel/serial conversion group 0–8 for performing parallel/serial conversion, wherein the image data maintained by the latch group 0–8 is converted into serial data and output. RDRQ signals requesting reading of the image data of the line buffer 1010 are output to the arbiter unit 1080 from the latch parallel/serial converting unit 1090.

The arbiter unit 1080 performs arbitration of the WRRQ signal from the selector 1050 and the RDRQ signal from the latch parallel/serial converting unit 1090, and at the same time directs access authorization to the line buffer memory 1010 to either the selector 1050 or the latch parallel/serial converting unit 1090. Following directing of the access authorization, a memory access control signal is output to the line buffer memory 1010 while giving an acknowledgment response using the access permission signal to the side which has obtained the access authorization, thus performing memory access. Specifically, a WRACK signal corresponding to the WRRQ signal from the selector 1050 is output to the corresponding I/F unit (the scanner I/F unit 1020, the decoder I/F unit 1030, or the DMA I/F unit 1040). Also, a RDACK signal is output to the latch parallel/serial converting unit 1090 as an acknowledgment response to the RDQD signal from the latch parallel/serial converting unit 1090.

Thus, by means of performing access requesting and corresponding acknowledgment responding via the arbiter 1080, speed conversion of the image transfer speed using the line buffer memory 1010 can be realized. For example, in the event that the image input speed is within a cycle range wherein the arbiter unit 1080 can respond to the WRRQ signals, the image input speed can be set at a speed within the aforementioned cycle range wherein response is possible, and consequently, the transfer speed of the image data input to the various I/F units, i.e., the scanner I/F unit 1020, the decoder I/F unit 1030, and the DMA I/F unit 1040, can be set at will within the aforementioned cycle range wherein response is possible, and a value can be also set separately for each image input device.

In the same way, in the event that the image output speed is within a cycle range wherein the arbiter unit 1080 can respond to the WRRQ signals, the image output speed can be set at a speed within the aforementioned cycle range wherein response is possible, and consequently, regarding reading of data image from the line buffer memory 1010, re-synchronization speed conversion for LBP 1500 output using the line buffer memory can be realized, by means of issuing an RDRQ signal to the latch parallel/serial converting unit 1090 so as cause the image data transfer speed of the image data following processing by any of the image processing units to match the transfer speed requested by the LBP 1500.

Also, at the arbiter 1080, line buffer control processing is performed for controlling the number of lines with image data residing therein, in order to cause the line buffer memory 1010 to operate as a ring buffer memory. This line buffer control processing will be described later.

Address control regarding data control corresponding to the selected image processing mode is performed by the WR address control unit 1060, and address control regarding data reading is performed by the RD address control unit 1070.

Figure 4A:
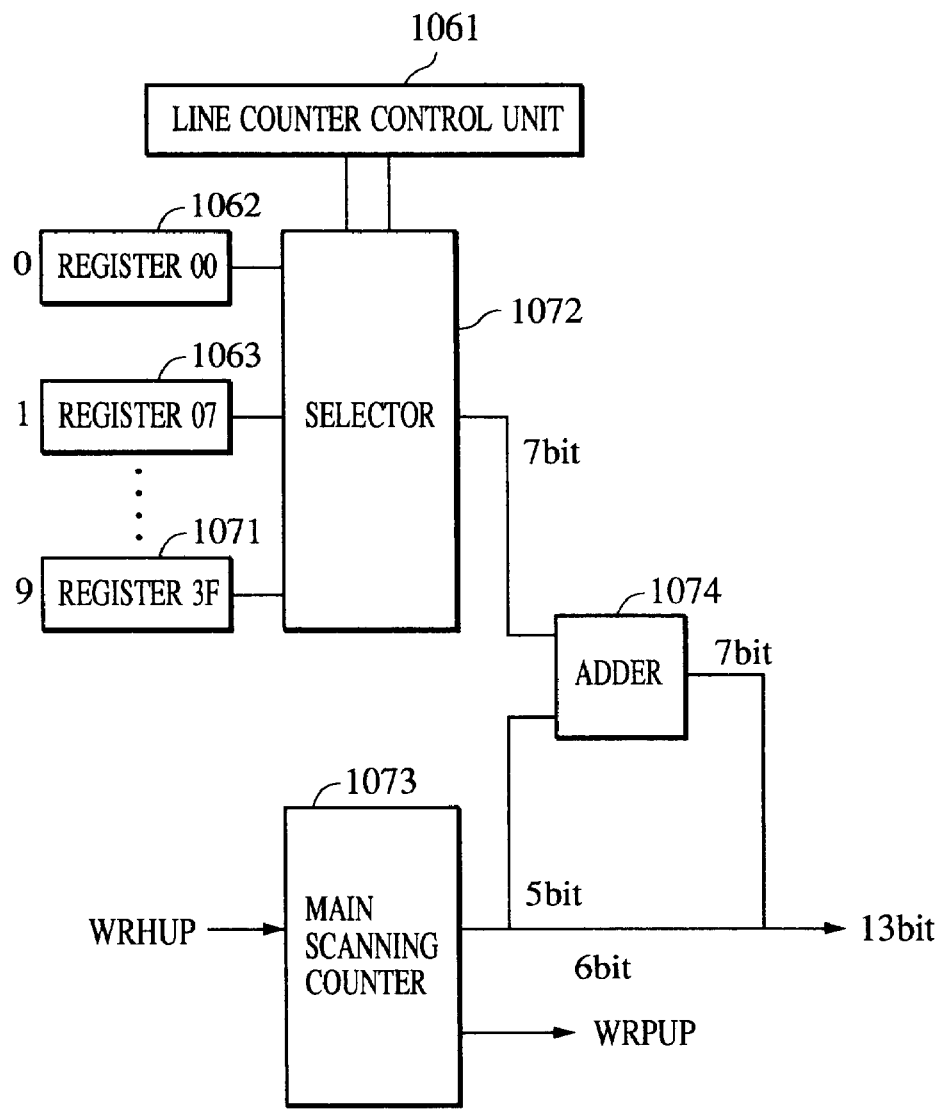
FIGS. 4A and 4B are block diagrams illustrating the construction of the WR address control unit provided to the line buffer memory control unit shown in FIG. 2.
Figure 4B:
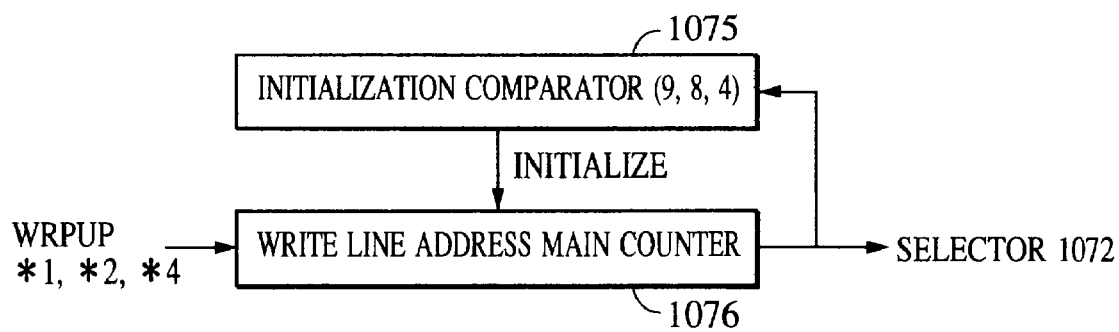

Next, the construction and operation of the WR address control unit 1060 will be described with reference to FIGS. 4A and 4B. FIGS. 4A and 4B are block diagrams illustrating the construction of the WR address control unit provided to the line buffer memory control unit 1060 shown in FIG. 2.

The WR address control unit 1060 has a plurality of registers 1062 through 1071, for storing the leading address for each line appropriated to the line buffer memory 1010, as shown in FIGS. 4A and 4B. In order to control the leading addresses of the lines with minimal units, the registers 1062 through 1071 each have stored therein offset addresses (sub-scanning direction addresses) as shown below:

Register 1062=>0 Register 1063=>07
Register 1064=>0E Register 1065=>15
Register 1066=>1C Register 1067=>23
Register 1068=>2A Register 1069=>31
Register 1070=>38 Register 1071=>3F One of the offset addresses maintained by the registers 1062 through 1071 is selected by the selector 1072 and then output to the adder 1074. Specifically, the selector 1072 selects and outputs one of the offset addresses in the registers 1062 through 1071 in accordance with a value output from the line counter control unit 1061.

As shown in FIG. 4B, in order to control the lines storing the image data, the line counter control unit 1061 has a WRITE address main counter 1076, and an initialization comparator 1075 to cause the WRITE address main counter 1076 to operate as a ring counter. The WRITE address main counter 1076 is incremented by one increased line in accordance with a WRPUP signal output from the later-described main scanning counter 1073. The value of the lines presently storing image data is maintained in the line counter control unit 1061, and this value is output as the value used to control the selective operation of the selector 1072.

The main scanning counter 1073 is comprised of a counter for controlling the main scanning direction address of the image data within each line in the line buffer memory 1010. WRHUP signals are input to the main scanning counter 1073 in accordance with writing arbitration being performed by the arbiter 1080 in response to the WRRQ signal, and the count of the main scanning counter 1073 is incremented by the WRHUP signal. Also, in the event that one line of image data is input, the main scanning counter 1073 is reset, and at the same time, a WRPUP signal is issued in order to increment the WRITE line address main counter 1076 by 1. The value of the WRITE line address main counter 1076 is incremented by 1, by means of this issued WRPUP signal.

The adder 1074 adds the offset address output from the selector 1072 and the count value of the main scanning counter 1073, and generates a write address for storing the actual image data, based on the results of this addition.

In the addition for the actual write address, the lower 6 bits of this write address are comprised of the lower 6 bits of the main scanning counter 1073 (######), and the upper 7 bits of the write address are comprised of the sum resulting from adding the upper 5 bits of the main scanning counter 1073 with the 7 bits of the offset address ($$$$$$$).

```
          ##########
     +    *******000000
          ───────────────
          $$$$$$$######
```

Next, the operation of the WR address control unit 1060 regarding each of the image processing modes will be described.

With the present embodiment, there is the necessity to switch over the number of reference lines and the maximum data length per line for each image processing mode, as described above. Therefore, as shown in FIG. 4, the incrementing value of the WRITE line address main counter 1076 is switched over in the manner of 1, 2, 4, thus switching over the number of lines and data length, i.e., the main scanning length. Specifically, the switching over the number of lines and data length is realized by switching over for with mode the increase value of the WRITE line address main counter 1076 incremented by WRPUP signals when a line of image data has been stored.

For example, in the event that the image processing unit B 1200 has been selected, the address is incremented by 1 each time that a WRPUP signal is issued, the registers 1062 through 1071 are sequentially selected, and when the WRITE line address main counter 1076 reaches "9", the count value of the WRITE line address main counter 1076 is initialized to "0". In the event that the image processing unit C 1300 has been selected, the address is incremented by 2 each time that a WRPUP signal is issued, the registers 1062, 1064, 1066, 1068, and 1070 are sequentially selected, and when the counter value reaches "8", the count value thereof is initialized to "0". In the event that the image processing unit A 1100 has been selected, the address is incremented by 4 each time that a WRPUP signal is issued, the registers 1062 and 1066 are alternately selected, and when the counter value reaches "4", the count value thereof is initialized to "0".

<Case where the image processing unit B has been selected>
 0: 00→0 (0000000000000)
 1: 07→100 (0000111000000)
 2: 0E→380 (0001110000000)
 3: 15→540 (0010101000000)
 4: 1C→700 (0011100000000)
 5: 23→8C0 (0100011000000)
 6: 2A→A80 (0101010000000)
 7: 31→C40 (0110001000000)
 8: 38→E00 (0111000000000)
 9: 3F→FC0 (0111111000000)
<Case where the image processing unit C has been selected>
 0: 00→0 (0000000000000)
 2: 0E→380 (0001110000000)
 4: 1C→700 (0011100000000)
 6: 2A→A80 (0101010000000)
 8: 38→E00 (0111000000000)
<Case where the image processing unit A has been selected>
 0: 00→0 (0000000000000)
 4: 1C→700 (0011100000000)

Thus, by means of the incrementing value of the WRITE line address main counter 1076 being switched over in the manner of 1, 2, 4, the write start address of each line is differentiated, and thereby the data length of each line is switched over between two-fold, four-fold, and eight-fold, and the number of lines is switched over between 10 lines, 5 lines, and 2 lines.

Figure 5:
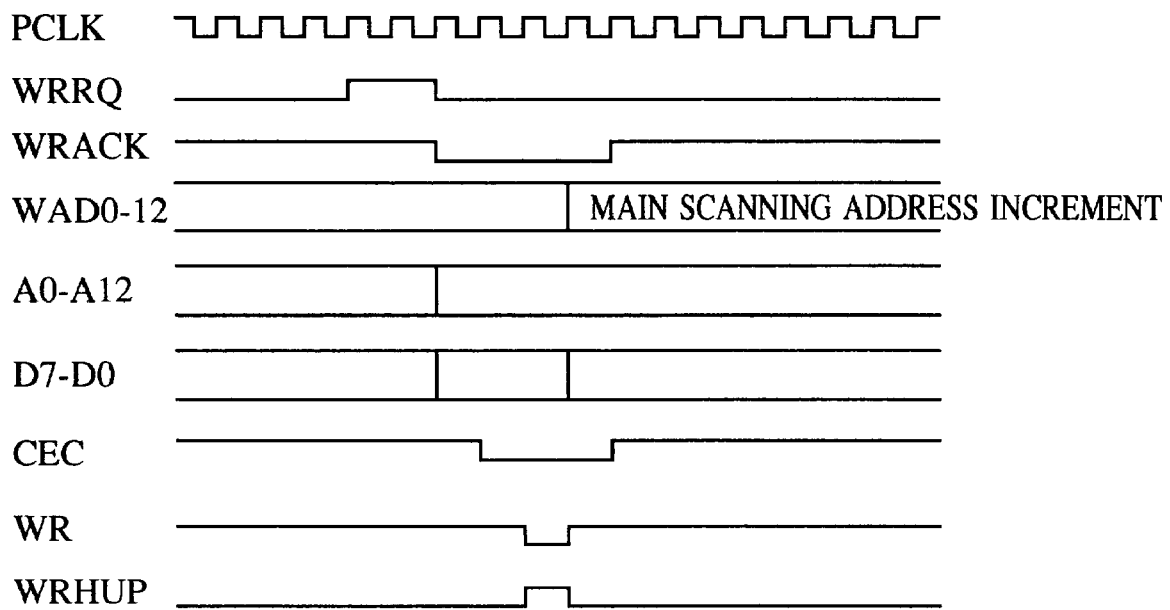
FIG. 5 is a timing chart illustrating the timing for writing to the line buffer memory in the line buffer memory control unit shown in FIG. 2.

Next, the memory access timing for when writing image data will be described with reference to FIG. 5. FIG. 5 is a timing chart illustrating the timing for writing to the line buffer memory 110 in the line buffer memory control unit shown in FIG. 2.

As shown in FIG. 5, the arbiter unit 1080, WR address control unit 1060, and the RD address control unit 1070 operates based on PCLK which is the standard clock, and when writing image data, the WRRQ signal is first output from the selector 1050 to the arbiter unit 1080.

Next, when the system makes transition to the WR cycle (write cycle) due to the WRRQ signal, a WRACK signal is output to the selector 1050 from the arbiter unit 1080 as an acknowledgment response, and at the same time, a CEC signal which is an access control signal and a WR signal is asserted to the line buffer memory 1010. Incidentally, in the present embodiment, the write address A0–A12 is taken into the line buffer memory 1010 at the falling edge of the CEC signal, and the image data D7–D0 is taken into the line buffer memory 1010 at the rising edge of the WR signal.

The WRACK signal is issued from the selector 1050 to the image input device, via the corresponding I/F unit.

The write address A0–A12 is output from the WR address control unit 1060, the WR address control unit 1060 selects and outputs the WAD0–WAD12 signal as the write address A0–A12.

The image data D7–D0 is image data packed in 8-bit units at the corresponding I/F unit, and is written to the line buffer memory 1010 via the arbiter 1080 following selection by the selector 1050.

When write access (WR access) is completed, a WRHUP signal instructing the main scanning counter 1073 to increment is output, and the main scanning counter 1073 increments the count value by 1, according to the WRHUP signal.

Figure 6A:
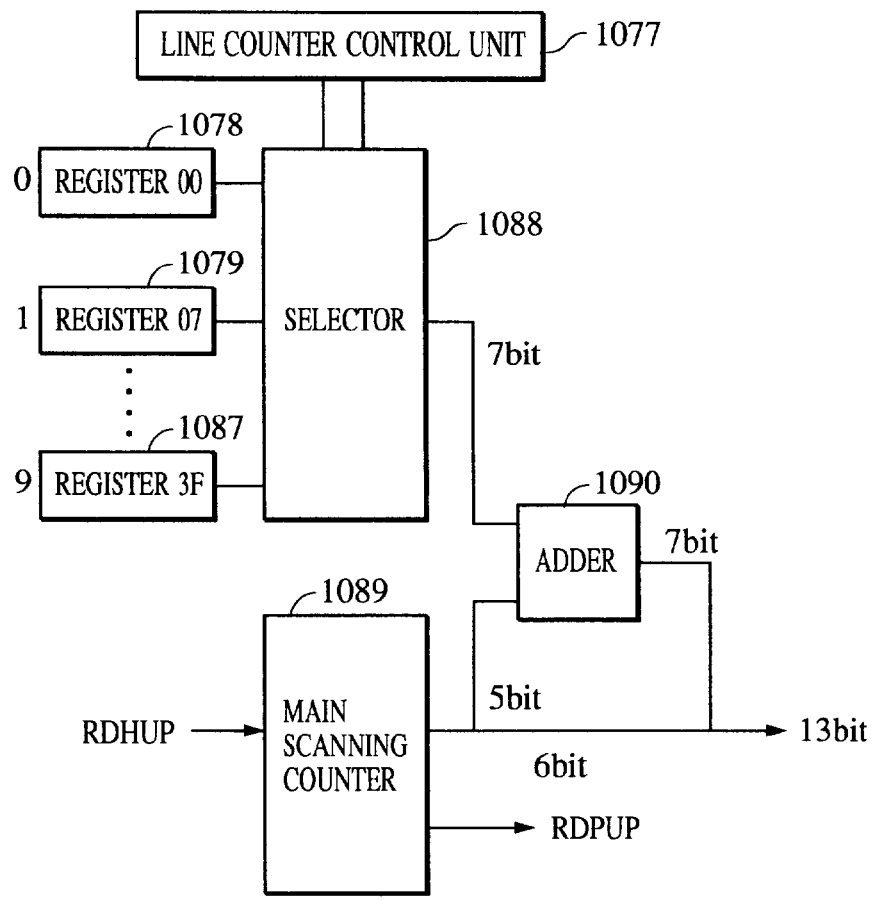
FIGS. 6A and 6B are block diagrams illustrating the construction of the RD address control unit provided to the line buffer memory control unit shown in FIG. 2.
Figure 6B:
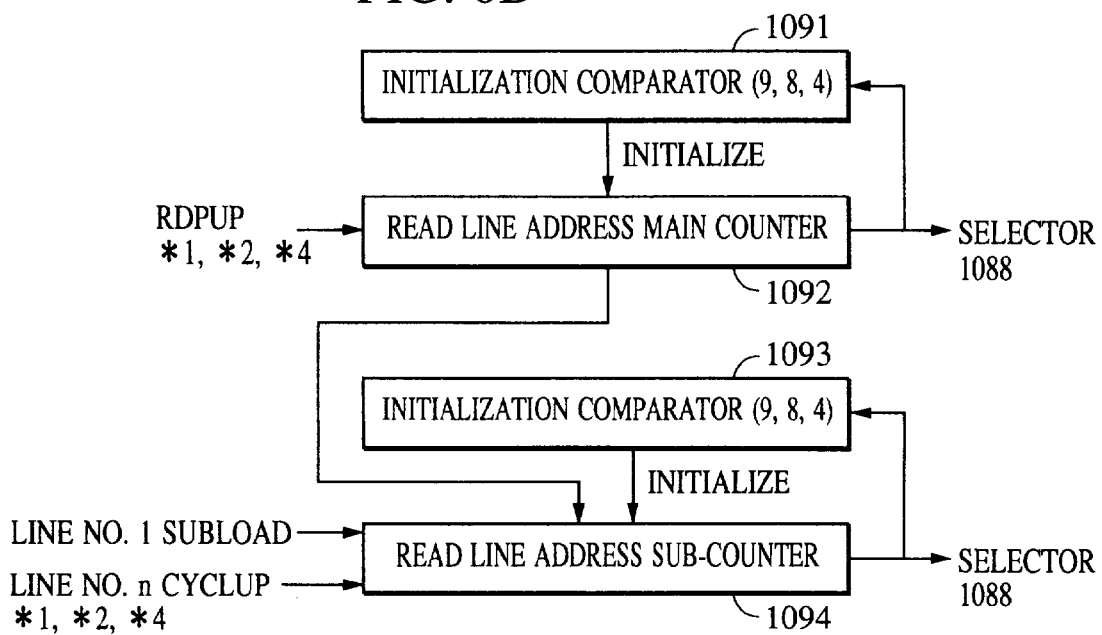

Next, description of the RD address control unit 1070 and the operation thereof ill be described with reference to FIGS. 6A and 6B. FIGS. 6A and 6B are block diagrams illustrating the construction of the RD address control unit 1070 provided to the line buffer memory control unit shown in FIG. 2.

The RD address control unit 1070 has a plurality of registers 1078 through 1087 for storing the leading address for each line appropriated to the line buffer memory 1010, and a main scanning counter 1089, as shown in FIG. 6A.

As with the registers 1062 through 1071 of the above-described WR control unit 1060, in order to control the leading addresses of the lines with minimal units, the registers 1078 through 1087 each have stored therein offset addresses (sub-scanning direction addresses). The offset addressees maintained by each of the registers 1078 through 1087 are selected from by the selector 1088, and the selected address is output to the adder 1090. Specifically, the selector 1088 selects and outputs one of the offset addresses in the registers 1078 through 1087 in accordance with a value output from the line counter control unit 1077.

As shown in FIG. 6B, the line counter control unit 1077 is comprised of a control unit to control the lines storing the image data, which has a READ address main counter 1092 for counting the value for selecting the offset address of the leading line of the reference line, an initialization comparator 1091 to cause the READ address main counter 1092 to operate as a ring counter, a READ line address sub-counter 1094 for performing incremented counting according to the selected image processing unit, and an initialization comparator 1093 to cause the READ address sub-counter 1094 to operate as a ring counter. The count value of the READ line address main counter 1092 is used for controlling the number of lines with image data residing therein which are in the alter-described line buffer memory 1010. This line counter control unit 1077 will be described in detail later.

The value of the lines currently storing image data is stored in the line counter control unit 1077, this value being output as a value for controlling the selective operation of the selector 1088.

The main scanning counter 1089 is comprised of a counter for controlling the main scanning direction address of the image data within each line in the line buffer memory 1010. RDHUP signals are input to the main scanning counter 1089 in accordance with reading being performed by the arbiter unit 1080 in response to the RDRQ signal, and the count of the main scanning counter 1089 is incremented by the RDHUP signal. Also, in the event that one line of image data is read, the main scanning counter 1089 is reset, and at the same time, an RDPUP signal is issued in order to increment the READ line address main counter 1092 by 1. The value of the READ line address main counter 1092 is incremented by 1 line, by means of this issued RDPUP signal.

The adder 1090 adds the offset address output from the selector 1088 and the count value of the main scanning counter 1089, and generates a read address for reading the actual image data, based on the results of this addition. The computing of this read address is performed in the same manner as the procedures for computing the write address with the adder 1074, as described above.

Thus, two line counters, i.e., a READ line address main counter 1092 and READ line address sub-counter 1094 are provided to the line counter control unit 1077 in the RD address control unit 1070, and in the event that image reading is to be performed over a plurality of lines, counting is performed by the READ line address sub-counter 1093 according to the number of reference lines necessary for image processing at the image processing unit which has been selected. Thereby, extracting of image data which extends over a plurality of lines including the reference line(s) all at one time is enabled.

Next, the operation of the line counter control unit 1077 under each image processing mode will be described.

With the present embodiment, as shown in FIG. 6B, at the time of reading image data that extends over a plurality of lines, counting is performed by the READ line address sub-counter 1094 according to the number of reference lines necessary for image processing at the image processing unit which has been selected while extracting the image data which extends over a plurality of lines all at one time, so at the point when reading of one line is completed, the READ line address main counter 1092 performs incrementing of one of the values of 0, 1, 2, or 4, in response to the incrementing request signal issued from each of the image processing units. The value "0" indicates that incrementing is not to be performed, in which case the same line is read multiple times, thereby realizing resolution conversion processing in the sub-scanning direction.

Also, the READ line address sub-counter 1094 takes in the count value of the READ line address main counter 1092 at the time of initiating read access (RD access), and at the same time, performs incrementing in accordance with the image processing unit selected by each read access extending over a plurality of reference lines. By means of the operation of this READ line address sub-counter 1094, address generating for reading image data extending over a plurality of reference lines is enabled.

For example, in the event that the image processing unit B 1200 is selected, 9 lines are required for reference lines, so the count value of the READ line address sub-counter 1094 is incremented by "1" in response to one data read request, while reading 9 bytes of data all at once. In this case, as shown below, the READ line address sub-counter 1094 is incremented 8 times starting from the count value of the READ line address main counter 1092. Also, both the READ line address main counter 1092 and READ line address sub-counter 1094 are initialized to "0" when the count value thereof reaches "9".

<Case where the image processing unit B has been selected>

Main counter 1092 Sub-counter 1094

| Count value | Count value |
| --- | --- |
| 0 | 0 -> 1 -> 2 -> 3 -> 4 -> 5 -> 6 -> 7 -> 8 |
| 1 | 1 -> 2 -> 3 -> 4 -> 5 -> 6 -> 7 -> 8 -> 9 |
| 2 | 2 -> 3 -> 4 -> 5 -> 6 -> 7 -> 8 -> 9 -> 0 |
| 3 | 3 -> 4 -> 5 -> 6 -> 7 -> 8 -> 9 -> 0 -> 1 |
| 4 | 4 -> 5 -> 6 -> 7 -> 8 -> 9 -> 0 -> 1 -> 2 |
| 5 | 5 -> 6 -> 7 -> 8 -> 9 -> 0 -> 1 -> 2 -> 3 |
| 6 | 6 -> 7 -> 8 -> 9 -> 0 -> 1 -> 2 -> 3 -> 4 |
| 7 | 7 -> 8 -> 9 -> 0 -> 1 -> 2 -> 3 -> 4 -> 5 |
| 8 | 8 -> 9 -> 0 -> 1 -> 2 -> 3 -> 4 -> 5 -> 6 |
| 9 | 9 -> 0 -> 1 -> 2 -> 3 -> 4 -> 5 -> 6 -> 7 |

In the event that the image processing unit C 1300 is selected, 2 lines are required for reference lines, so the count value of the READ line address sub-counter 1094 is incremented by "2" in response to one data read request, while reading 2 bytes of data all at once. In this case, as shown below, the READ line address sub-counter 1094 is incremented 1 time starting from the count value of the READ line address main counter 1092. The reason that the increment value for the count value of the READ line address main counter 1092 is set to "2" is that the maximum length of one line of data that the image processing unit C can process is twice that of the image processing unit B. That is, the processing operation of the image processing unit C operates at twice the speed of the image processing unit B. Also, both the READ line address main counter 1092 and READ line address sub-counter 1094 are initialized to "0"when the count value thereof reaches "8".

<Case where the image processing unit C has been selected>

Main counter 1092 Sub-counter 1094

| Count value | Count value |
| --- | --- |
| 0 | 0 -> 2 |
| 2 | 2 -> 4 |
| 4 | 4 -> 6 |
| 6 | 6 -> 8 |
| 8 | 8 -> 0 |

In the event that the image processing unit A 1100 is selected, no lines are required for reference lines, so the READ line address sub-counter 1094 simply takes in the count value of the READ line address main counter 1092. The reason that the increment value for the count value of the READ line address main counter 1092 is set to "4" is that the maximum length of one line of data that the image processing unit A can process is four times that of the image processing unit B. That is, the processing operation of the image processing unit A operates at four times the speed of the image processing unit B. Also, both the READ line address main counter 1092 and READ line address sub-counter 1094 are initialized to "0" when the count value thereof reaches "4".

<Case where the image processing unit A has been selected>
Main counter 1091 Sub-counter 1094

| Count value | Count value |
|---|---|
| 0 | 0 |
| 4 | 4 |

Thus, extracting image data which extends over a plurality of lines all at one time while counting is being performed by the READ line address sub-counter 1094 according to the number of reference lines necessary for image processing at the image processing unit which has been selected, is enabled. The number of reference lines necessary for each selected image processing unit is brought about by varying the count value to the READ line address sub-counter 1094.

Figure 7A:
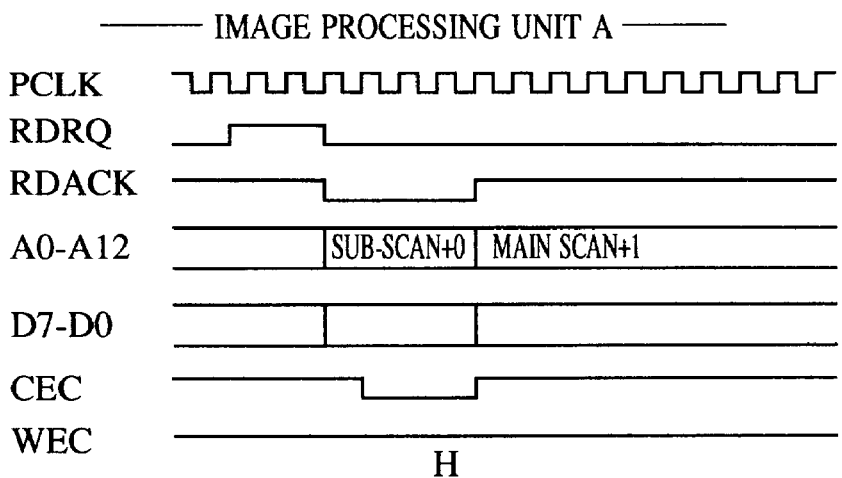
FIGS. 7A, 7B, and 7C are timing charts illustrating the timing for reading from the line buffer memory in the line buffer memory control unit shown in FIG. 2.
Figure 7B:
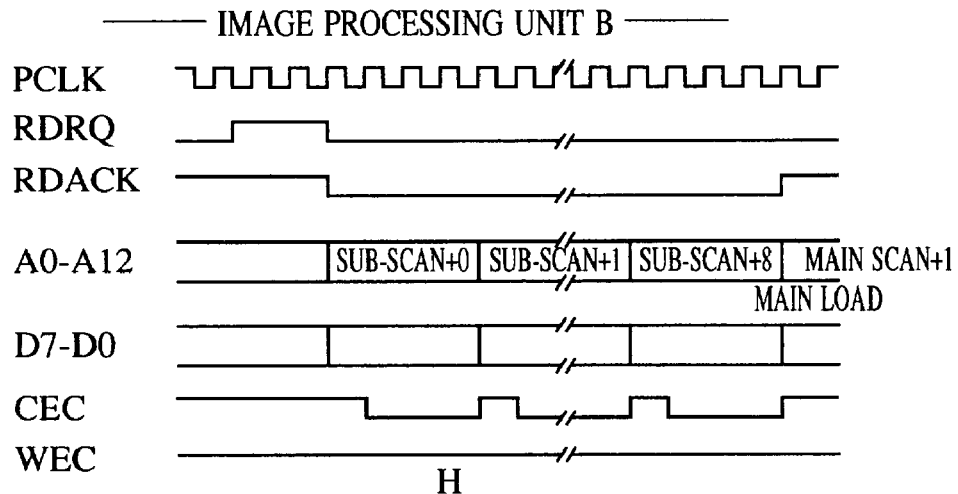
Figure 7C:
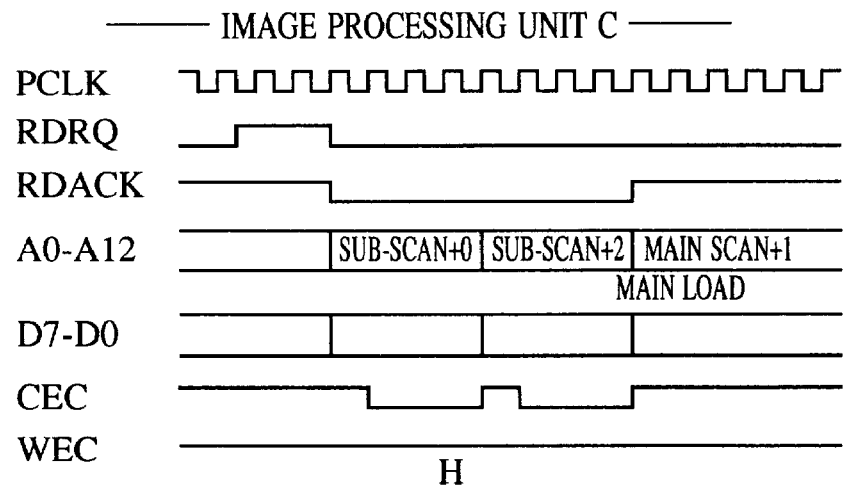

Next, the memory access timing for when reading image data will be described with reference to FIGS. 7A–7C. FIGS. 7A–7C are timing charts illustrating the timing for writing to the line buffer memory 1010 in the line buffer memory control unit shown in FIG. 2.

As shown in FIGS. 7A–7C, the RD address control unit 1070, the arbiter unit 1080, and the WR address control unit 1060 operate based on a signal PCLK, which is the standard clock, and when reading image data, the RDRQ signal is first output from the latch parallel/serial converting group 1090 to the arbiter unit 1080.

Next, when the system makes transition to the RD cycle due to the RDRQ signal, a RDACK signal is output to the latch parallel/serial converting group 1090 from the arbiter unit 1080 as an acknowledgment response to the RDRQ signal, and at the same time, a CEC signal which is an access control signal and a WEC signal is de-asserted to the line buffer memory 1010. Incidentally, in the present embodiment, the write address A0–A12 is taken into the line buffer memory 1010 at the falling edge of the CEC signal, and the image data D7–D0 corresponding to the address is output. Also, the WEC signal is a write permission signal, and is maintained in the "H" (high) state on the inactive side when reading.

The read address A0–A12 is selected and output from the RD address control unit 1070, with the starting point accessed from this address A0–A12 being determined by a value indicated by "sub-scan +*" in the figure. The value indicated by "*" indicates a variable value of the READ line address sub-counter 1094 to be the first starting point. Also, in the figure, the term "main scan +1" indicates that the counter value of the main scanning counter 1089 is incremented by "1".

In the event that the image processing unit A is selected, as shown in FIG. 7A, 1 byte is read with each read access. Accordingly, there is no access incrementing performed during reading. When this read access is completed, the main scanning counter 1089 is incremented by means of a RDHUP signal (not shown). In the event that the image processing unit B is selected, as shown in FIG. 7B, read access is performed 9 consecutive times. Accordingly, the CEC signal is asserted "0" 9 times, and the READ line address sub-counter 1094 changes the count value thereof by "1" at a time. When this read access is completed, the main scanning counter 1089 is incremented by means of a RDHUP signal (not shown). In the event that the image processing unit C is selected, as shown in FIG. 7C, read access is performed 2 consecutive times. Accordingly, the CEC signal is asserted "0" 2 times, and the READ line address sub-counter 1094 changes the count value thereof by "2" at a time. However, no incrementing of access is performed during reading. When this read access is completed, the main scanning counter 1089 is incremented by means of a RDHUP signal (not shown).

Next, description will be made regarding the line buffer control processing wherein the number of lines with image data residing therein is controlled by the arbiter unit 1080.

With this line buffer control processing, over-run control and under-run control is performed, in order to cause the line buffer memory 1010 to serve as ring buffer memory. In these controls, access is pending or restarted so that over-run or under-run does not occur, in response to access requests from the various I/F units, i.e., the scanner I/F unit 1020, the decoder I/F unit 1030, the DMA I/F unit 1040, and the latch parallel/serial converting unit 1090. The control in response to access requests from the various I/F units is performed based on line head addresses, since basically control of lines with image data residing therein is performed in units of lines.

For example, in the event that there is an empty line in the line buffer memory 1010, a write request to the line buffer memory 1010 is permitted, and an acknowledgment response is made by a WRACK signal. Conversely, in the event that the line buffer memory 1010 has been written full of data and no more data can be written, the acknowledgment response made by a WRACK signal is held pending, and thereby image input is held pending (i.e., is suspended temporarily).

Access control to the read request from the latch parallel/serial converting unit 1090 is performed under the conditions that the number of lines controlled is in a state of under-run and also there has been the first read request for line output. In the event that the number of lines controlled is in a state of under-run, responses to read requests are held pending until image data is stored again and the state of under-run is resolved. During image data output by the LBP 1500, input of image data is conducted so that such response suspension does not occur. Such request suspension occurs when switching over image blocks within a page, and in the event that such a request suspension does happen to occur, the image blocks are connected by means of the corresponding image processing unit outputting white data.

A line control counter 1600 comprised of an up/down counter provided within the arbiter unit 1080 is used for control of the number of lines with image data residing therein in the line buffer memory 1010. The line control counter 1600 is incremented by 1 with each line written, and decremented by 1 with each line read. Specifically, the initial value of the line control counter 1600 is "0", and when image data is input from the various I/F units, i.e., the scanner I/F unit 1020, the decoder I/F unit 1030, and the DMA I/F unit 1040, the counter is incremented by means of a WRPUP signal issued from the WR address control unit 1060, and decremented by means of a RDPUP signal issued from the each of the image processing units in conjunction with updating the reference lines. Thus, control of the number of lines with image data residing therein is performed by means of the count value of the line control counter 1600 which performs counting operations.

Next, description will be made regarding the over-run control and under-run control which is performed regarding each image processing unit.

In the event that the image processing unit B 1200 is selected, as shown below, processing operations are initiated presuming that there are 4 lines of white data residing in the buffer. This is to perform virtual addition of white to the surrounding portion of the image. Since 9 lines of reference lines are required with the image processing unit B 1200, the state of under-run is canceled at the point that image data is stored in 5 lines in addition to the above-described 4 lines of white data. Also, since the total number of lines appropriated to the line buffer memory 1010 is 10, in the event that the count value of the line control counter 1600 is "6", this is judged to be an over-run, and the write requests are held pending, and in the event that the count value of the line control counter 1600 is "4", this is judged to be an under-run, and the read requests are held pending. Further, at the time of completing image output of one block, image discharge is performed by external command until the value of the line control counter 1600 is "0", thus completing the processing.

<Case where the image processing unit B has been selected>
Line control counter

| Count value | | |
|---|---|---|
| 0 | -> | Image discharge completed |
| 1 (+4) | | |
| 2 (+4) | | |
| 3 (+4) | | |
| 4 (+4) | -> | Under-run, RD forbidden, white line sent |
| 5 (+4) | -> | RD/WR OK |
| 6 (+4) | -> | WR forbidden |

In the event that the image processing unit C 1300 is selected, 2 lines are required for reference lines and 5 lines are appropriated. Accordingly, as shown below, in the event that the count value of the line control counter 1600 is "5", this is judged to be an over-run, and the write requests are held pending, and in the event that the count value is "1", this is judged to be an under-run, and the read requests are held pending.

<Case where the image processing unit C has been selected>
Line control counter

| Count value | | |
|---|---|---|
| 0 | -> | Image discharge completed |
| 1 | -> | Under-run, RD forbidden, white line sent |
| 2 | -> | RD/WR OK |
| 3 | -> | RD/WR OK |
| 4 | -> | RD/WR OK |
| 5 | -> | WR forbidden |

In the event that the image processing unit A 1100 is selected, 1 line is required for reference lines and 2 lines are appropriated. Accordingly, as shown below, in the event that the count value of the line control counter 1600 is "2", this is judged to be an over-run, and the write requests are held pending, and in the event that the count value is "0", this is judged to be an under-run, and the read requests are held pending.

<Case where the image processing unit A has been selected>
Line control counter

| Count value | | |
|---|---|---|
| 0 | -> | Under-run, RD forbidden, white line sent, Image discharge completed |
| 1 | -> | RD/WR OK |
| 2 | -> | WR forbidden |

Figure 8:
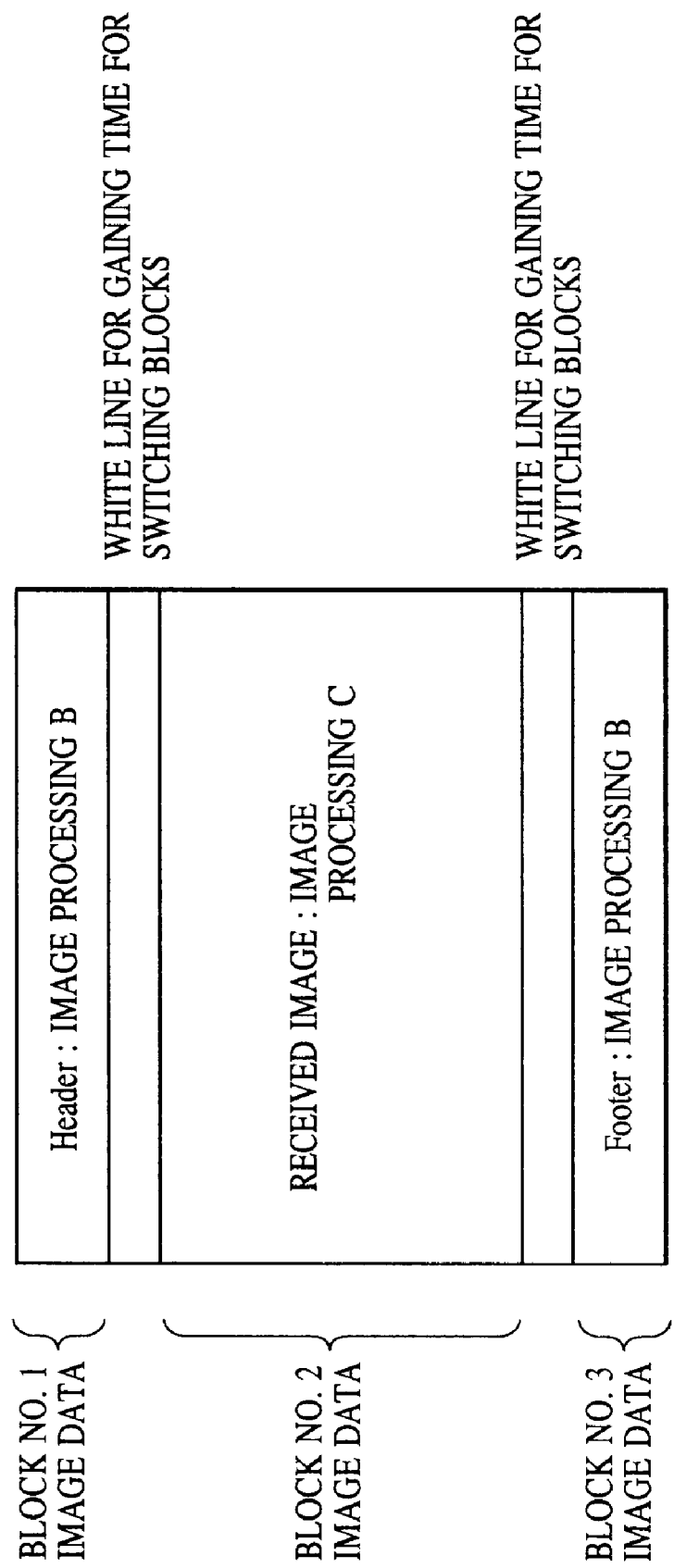
FIG. 8 is a diagram illustrating an example of an output image, with a header image and footer image provided to a received facsimile image with the copier/facsimile apparatus according to FIG. 1.

Next, description will be made regarding switching over of image processing and switching over of input image blocks during image printing output of a page, with reference to FIG. 8 and FIG. 9. FIG. 8 is a diagram illustrating an example of an output image, with a header image and footer image provided to a received facsimile image with the copier/facsimile apparatus according to FIG. 1, and FIG. 9 is a timing chart illustrating the switch-over timing regarding the input/output of the three image blocks in the image being output in FIG. 8. When receiving a facsimile the received image is temporarily stored in the RAM 300 as image data and is subsequently decoded by the decoding unit 900, following which the decoded image data is stored in the line buffer memory 1010 via the decoding unit I/F unit 1030. This image data stored in the line buffer memory 1010 is output to the LBP 1500 after being subjected to size variation corresponding to the size of the recording paper used in the LBP 1500 and the resolution thereof, this processing being performed by the image processing unit C 1300. At the LBP 1500, as shown in FIG. 8, a header image and footer image is provided to the received facsimile image, and together is recorded on the recording paper.

The header image and footer images are images rendered by the CPU 100 to the RAM 300, and each piece of image data is stored in the line buffer memory 1010 from the RAM 300 vie the DMA I/F unit 1040 by means of direct memory access. Each piece of image data is subjected to resolution conversion processing for converting the resolution of 200 dpi into that of 600 dpi by means of the image processing unit B 1200, and then is output to the LBP 1500.

Next, description will be made regarding the switching timing of the input/output of the received facsimile image, header image and footer image. Incidentally, in this description, the image data representing the received facsimile image is handled as image data block No. 2, the image data representing the header image is handled as image data block No. 1, and the image data representing the footer image is handled as image data block No. 3.

With reference to FIG. 9, first, the level of PENB which is the page separation signal is set to "H" before starting the recording operations of the page, thus activating the recording operation process.

Next, the level of BLKENB_IN which represents the input time duration of the block image data is maintained at "H", and at the same time, the image data block No. 1 DATA_IN is input to the line buffer memory 1010 from the RAM 300 via the DMA I/F unit 1040, thereby starting storage of the image data block No. 1.

Once the image data block No. 1 DATA_IN fills the line buffer memory 1010 to capacity, writing requests of image data writing are put on hold by means of the line buffer control process conducted by the arbiter unit 1080, and the image processing unit B 1200 is selected as the image processing unit which corresponds with the image data block No. 1 DATA_IN.

Next, when printing initiation of the LBP 1500 is called, the LBP 1500 issues XTOP which is a vertical synchronous signal. After an amount of time which is the printing margin time passes from the point of issuing this XTOP till the recording starting position at the leading edge of the image is reached, image output is started. The level of BLKENB_OUT which indicates the output duration of the block image data is maintained in the "H" state while keeping timing with this image output, and also reading of the image data block No. 1 DATA_IN from the line buffer memory 1010 is started. The read image data is processed by the image processing unit B 1200, and then is output to the LBP 1500 as XVDO. When open space is generated in the line buffer memory 1010 due to this reading, the state of suspension of read requests is canceled, and the storage of the image data block No. 1 DATA_IN in the line buffer memory 1010 is resumed.

Once the input of the image data block No. 1 DATA_IN is completed, a notification of image input completion is output from the CPU 100, thus performing image discharging processing, and also the level of BLKENB_IN is switched from the "H" to the "L" (low) state. Also, when the output of the image data block No. 1 DATA_IN is completed, the level of BLKENB_OUT is switched to the "L" state, and switching from the DMA I/F unit 1040 to the decoder unit I/F unit 1030, and switching from the image processing unit B 1200 to the image processing unit C 1300 is performed.

After a certain amount of time passes from the point that the level of BLKENB_IN is switched from the "H" to the "L" state wherein the input is held pending, the level of BLKENB_IN is switched to the "H" state, and the image data block No. 2 DATA_IN is input via the decoding unit I/F unit 1030, thereby starting storage of the image data block No. 2 DATA_IN. During the time between the point of switching the level of BLKENB_OUT from the "H" to the "L" state till the point at which output of the image data block No. 2 DATA_IN can be conducted, i.e., until under-running is resolved, white data is output to the LBP 1500.

Once under-running is resolved, the image data block No. 2 DATA_IN is read from the line buffer memory 1010, and the read image data is processed by the image processing unit C 1300, and then is output to the LBP 1500 as image data XVDO.

Once the input of the image data block No. 2 DATA_IN is completed, a notification of image input completion is output from the CPU 100, thus performing image discharging processing, and also the level of BLKENB_IN is switched from the "H" to the "L" state. Also, when the output of the image data block No. 2 DATA_IN is completed, the level of BLKENB_OUT is switched to the "L" state, and switching back to the DMA I/F unit 1040 and to the image processing unit B 1200 is performed.

After a certain amount of time passes from the point that the level of BLKENB_IN is switched from the "H" to the "L" state wherein the input is pending, the level of BLKENB_IN is switched to the "H" state, and the image data block No. 3 DATA_IN is input via the DMA I/F unit 1040, thereby starting storage of the image data block No. 3 DATA_IN. During the time between the switching of the level of BLKENB_OUT from the "H" to the "L" state till the point at which output of the image data block No. 3 DATA_IN can be conducted, i.e., until under-running is resolved, white data is output to the LBP 1500.

Once under-running is resolved, the image data block No. 3 DATA_IN is read from the line buffer memory 1010, and the read image data XVDO is output to the LBP 1500 following processing by the image processing unit B 1200.

Once the output of a page of image data is thus completed, image discharging processing is performed for the image data in the line buffer memory 1010, and when this image discharging processing is completed, the level of PENB is returned to the "L" state, thus deactivating the recording operation process, and the printing output by the LBP 1500 is finished.

Hence, with the line buffer memory control unit 1000 according to the present embodiment, a single line buffer memory 1010 is provided, the line buffer memory 1010 is divided into a plurality of lines when storing image data in the line buffer memory 1010 and storage address control is performed so that each divided line can be accessed, and also read address control is performed so that each divided line can be accessed when reading the image data from the line buffer memory 1010. Thus, a single line buffer memory can be used as both a speed conversion absorption buffer memory for an image input device and also as a reference buffer memory for each of the image processing devices, thus preventing the construction of the apparatus from becoming complicated due to complex functions such as photocopying functions, facsimile functions, and printer functions.

Also, the arrangement is such that the access execution timing responding to the write request signal and the access execution timing responding to the read request signal can be switched over, so that the timing of the input/output of the image data can be changed. Thus, a single line buffer memory 1010 can be used in common while easily performing switching of the input source of the image data and the output destination of the image data during recording of a page.

Further, in the event that a mode is selected wherein the image processing unit is to be switched over for each image block of the image data input from the selected image input device during printing of image data of a page, read address control is performed while changing the number of reference lines necessary for each selected image processing unit and extracting image data extending over a plurality of lines, all at once. Thus, image processing desired for each image block in a page can be performed.

As described above, the present embodiment comprises: a single line buffer memory which serves both as a speed conversion buffer memory and as a reference buffer memory; memory access arbitrating means for arbitrating between image storage request signals from image supplying means selected by input selecting means, and image read request signals from image processing means selected by processing selecting means; and address control means which performs write address control so as to divide the line buffer memory into a plurality of lines in accordance with the selected image processing means and accesses each divided line and performs storing of image data corresponding with each line when storing corresponding image data to the line buffer memory in response to the image storage request signal from the image supplying means selected with the input selecting means, and also which performs read address control by accessing each divided line when reading corresponding image data from the line buffer memory in response to the image read request signal from the image processing means selected with the processing selecting means and reads image data from each line; wherein, in the event that the selected image processing means requires the reference image data for the processing thereof, the address control means performs read address control so that image data extending over a plurality of lines all is extracted at once, including the reference line(s) on which the reference image data is stored. Thus, a single line buffer memory can be used in common for a speed conversion buffer memory for image supplying means and a buffer memory for reference for image processing means, thereby preventing the construction of the apparatus from becoming complicated due to complex functions such as photocopying functions, facsimile functions, and printer functions.

Also, in the event that a mode is selected wherein the image processing means selected by the processing selecting means is to be switched over for each image block of the image data input from the selected image supplying means during image formation if a page of image data by image forming means, the address control means performs read address control so that the number of reference lines necessary for each selected image processing means is changed accordingly and image data extending over a plurality of lines all is extracted at once, including the reference line(s). Thus, image processing for each image block in a page can be performed by the desired image processing means.

Also, the address control means is provided with: storage address control means for performing storage address control; and read address control means for performing read address control. The storage address control means can comprise: a write main scanning counter for counting addresses within each line of the line buffer memory; a write register for maintaining the write leading address of each line in the line buffer memory; a write line counter for specifying the line to which the data of the line buffer memory is to be written; write destination leading address selecting means for selecting the leading address for the line which serves as the destination for writing data from each write leading address of the write registers based on the value of the write line counter; and a write adder which generates an image data write address by adding the write leading address selected by the write leading address selecting means and the count value of the write main scanning counter. Further, the read address control means can comprise: a read main scanning counter for counting the addresses within one line of the line buffer memory; a read register for maintaining the read leading address of each line of the divided line buffer memory; a read main line counter for controlling the first read line of a plurality of read lines; a read sub-line counter for controlling the extracting address for image data which extends over a plurality of lines; read leading address selecting means for selecting the line read leading address which is the data reading position from each of the read leading addresses of the registers, based on the count value of the read main line counter and sub-line counter; and a read adder which generates read addresses for image data by adding the read leading address selected by the read leading address selecting means and the read main scanning counter count value; so that in the event of reading image data extending over a plurality of lines, counting is performed with the read sub-line counter according to the number of reference lines necessary for the image processing by each selected image processing means and image data extending over a plurality of lines all is extracted all at once, and the value of the read sub-line counter is changed according to the number of reference lines necessary for the selected image processing means. Thus, the number of reference lines can be made to be variable.

Also, an up/down counter is used for controlling the number of divided lines, and the incremented value of the up/down counter is controlled so as to be able to be switched according to the number of divided lines. Thus, the number of divided lines can be easily controlled.

Further, the number of divided lines is set in each image processing means beforehand.

Further yet, the memory access arbitrating means performs arbitration of image storage request signals and image read request signals so that switching can be performed between the access execution timing responding to image storage request signals and access execution timing responding to image read request signals, according to the selected timing of the image supplying means using input selecting means and the selected timing of the image processing means using processing selecting means. Thus, a single line buffer memory can be used in common while easily performing switching of the input source of the image data and switching of the output destination of the image data during the image formation operation of a page.

Furthermore, the image storage request signal from the image supply means selected by the input selecting means and the image read request signal from the image processing means selected by the processing selecting means are arbitrated; in the event that corresponding image data is stored in the line buffer memory in response to image storage request signals from the image supplying means selected by the input selecting means, the line buffer memory is divided into a plurality of lines according to the selected image processing means and write address control is performed so that each divided line is accessed and that image data corresponding to each line is stored therein; in the event of reading corresponding image data from the line buffer memory in response to the image read request signal from the image processing means selected by the processing selecting means, read address control is performed so that each divided line is accessed and that image data is read from each line; and in the event that the selected image processing means requires reference image data for the processing thereof, read address control is performed so that image data extending over a plurality of lines is extracted all at once, including the reference line on which the reference image data is stored. Thus, a single line buffer memory can be used in common for a speed conversion buffer memory for image supplying means and a buffer memory for reference for image processing means, thus preventing the construction of the apparatus from becoming complicated due to complex functions such as photocopying functions, facsimile functions, and printer functions.

Moreover, in the event that a mode is selected wherein switching is performed regarding the image processing means selected by the processing selecting means for each image block of the image data input from the image supplying means selected during image forming of the image data of a page by the image forming means, read address control is performed so that image data extending over a plurality of lines is extracted all at once, including the reference line(s) while changing the number of reference lines necessary for each of the selected image processing means. Thus, desired image processing can be performed on each image block in a page by the desired image processing means.

Also, an up/down counter is used for controlling the number of divided lines, and the count value of the up/down counter is controlled so as to be able to be switched according to the number of divided lines. Thus, the number of divided lines can be easily controlled.

Further, the number of divided lines can be set in each image processing means beforehand.

Further yet, arbitration is performed of image storage request signals and image read request signals so that switching can be performed between the access execution timing responding to image storage request signals and access execution timing responding to image read request signals, according to the selected timing of the image supplying means using input selecting means and the selected timing of the image processing means using processing selecting means. Thus, a single line buffer memory can be used in common while easily performing switching of the input source of the image data and switching of the output destination of the image data during the image formation operation of a page.

Further, a buffer memory control device comprises: a single line buffer memory which serves both as a speed conversion buffer memory and reference buffer memory; memory access arbitrating means for arbitrating between image storage request signals from image supplying means selected by input selecting means, and image read request signals from image processing means selected by processing selecting means; and address control means which performs write address control so as to divide the line buffer memory into a plurality of lines in accordance with the selected image processing means and accesses each divided line and performs storing of image data corresponding with each line when storing corresponding image data in the line buffer memory in response to the image storage request signal from the image supplying means selected with the input selecting means, and also which performs read address control by accessing each divided line when reading corresponding image data from the line buffer memory in response to the image read request signal from the image processing means selected with the processing selecting means and reads image data from each line; wherein, in the event that the selected image processing means requires the reference image data for the processing thereof, the address control means performs read address control so that image data extending over a plurality of lines is extracted all at once, including the reference line(s) on which the reference image data is stored. Thus, a single line buffer memory can be used in common for a speed conversion buffer memory for image supplying means and a buffer memory for reference for image processing means, thereby preventing the construction of the apparatus from becoming complicated due to complex functions such as photocopying functions, facsimile functions, and printer functions.

The present invention has been described above with reference to a preferred embodiment, but the present invention is by no means restricted to this construction; rather, it is needless to say that various changes and variations may be made in the invention without departing from the scope of the accompanying claims.

What is claimed is:

1. A buffer memory control device, comprising:
   input means for input of image data one line at a time;
   storage means for temporarily storing a plurality of lines of image data read from said storage means;
   output means for performing parallel output of a plurality of lines of image data read from said storage means; and
   control means for controlling writing of image data into said storage means and/or reading therefrom, in response to a request from said input means to write image data into said storage means and/or a request from said output means to read image data, wherein said control means is adapted to grant the requests in accordance with the number of lines of image data being stored in said storage means.

2. A buffer memory control device according to claim 1, wherein said control means grants the requests in accordance with whether or not the number of lines of image data being stored in said storage means is a predetermined number.

3. A buffer memory control device according to claim 1, wherein said input means selectively inputs image data generated from each of a plurality of data sources.

4. A buffer memory control device according to claim 1, wherein said output means selectively outputs image data to each of a plurality of image processing units.

5. A buffer memory control device, comprising:
   input means for input of image data one line at a time;
   storage means for temporarily storing at least one line of image data input from said input means;
   output means for selectively outputting at least one line of image data read from said storage means to an image processing unit; and
   control means for controlling the number of lines of image data to be temporarily stored in said storage means, in accordance with the image processing unit to which the image data is to be output from said output means.

6. A buffer memory control device according to claim 5, wherein said control means controls the number of lines of image data to be temporarily stored in said storage means, according to the number of lines of image data to be output from said output means to the image processing unit.

7. A buffer memory control device according to claim 5, wherein said input means selectively inputs image data generated from each of a plurality of data sources.

8. A buffer memory control device according to claim 5, further comprising reading means for reading image data from said storage means, in response to read requests of image data from said output means to said storage means.

9. A buffer memory control device, comprising:
   input means for selectively inputting image data generated by a plurality of data sources one lines at a time;
   storage means for temporarily storing at least one line of image data input from said input means;
   output means for selectively outputting the image data read from said storage means to one of a plurality of image precessing units; and
   control means for controlling the number of lines of image data to be temporarily stored in said storage means and the amount of data per line, based on the format of the image data input from said input means and the format of the image data output from said output means.

10. A buffer memory control device according to claim 9, wherein the amount of data per line of image data input from said input means differs for each of the plurality of data sources.

11. A buffer memory control device according to claim 9, wherein the number of lines of image data output in parallel from said output means differs for each of the plurality of image processing units.

12. An image processing device, comprising:
   generating means for generating image data one line at a time;
   storage means for temporarily storing a plurality of lines of image data generated by said generating means;
   processing means for performing image processing on a plurality of lines of image data read form said storage means; and
   control means for controlling writing image data to said storage means and/or reading therefrom, in response to a request to write image data from the side of said generating means and/or a request to read image data from the side of said processing means, wherein said control means is adapted to grant the requests in accordance with the number of lines of image data being stored in said storage means.

13. An image processing device according to claim 12, wherein said control means grants the request in accordance with whether or not the number of lines of image data being stored in said storage means is a predetermined number.

14. An image processing device, comprising:
   a plurality of generating means for generating image data of differing formats, one line at a time;
   storage means for temporarily storing at least one line of image data generated by one of said plurality of generating means;

a plurality of processing means for performing image processing on at least one line of image data read from said storage means; and control means for controlling the number of lines of image data to be temporarily stored in said storage means and the amount of data per line, based on which of said generating means has generated the data to be stored in said storage means and which of said processing means is to perform image processing on the image data read from said storage means.

15. An image processing device according to claim 14, wherein said plurality of generating means generate image data with differing resolution.

16. An image processing device according to claim 14, wherein said plurality of processing means refer to image data with differing numbers of lines, to perform their image processing.

17. A method for buffer memory control, comprising the steps of:

inputting image data one line at a time;

temporarily storing, in a storage unit, a plurality of lines of image data input in said inputting step;

performing parallel output of a plurality of lines of image data read from the storage unit; and controlling writing image data to the storage unit and/or reading therefrom, in response to a request to write image data input in said inputting step and/or a request to read image data for the parallel output in said performing step, wherein the requests are granted in accordance with the number of lines of image data being stored in the storage unit.

18. A buffer memory control method according to claim 17, wherein said controlling step grants the requests in accordance with whether or not the number of lines of image data being stored in the storage unit is a predetermined number.

19. A buffer memory control method according to claim 17, wherein, in said inputting step, image data generated from each of a plurality of data sources is selectively input.

20. A buffer memory control method according to claim 17, wherein, in said performing step, image data is selectively output to each of a plurality of image processing units.

21. A method of buffer memory control, comprising the steps of:

inputting image data one line at a time;

temporarily storing, in a storage unit, at least one line of image data input in said inputting step;

selectively outputting at least one line of image data read from the storage unit to a image processing unit; and controlling the number of lines of image data to be temporarily stored into the storage unit, in accordance with the image processing unit to which the image data is to be output to in said outputting step.

22. A buffer memory control method according to claim 21, wherein said controlling step includes controlling the number of lines of image data to be temporarily stored in the storage unit, according to the number of lines of image data to be output in said outputting step to the image processing unit.

23. A buffer memory control method according to claim 21, wherein said inputting step includes selectively inputting image data generated from each of a plurality of data sources.

24. A buffer memory control method according to claim 21, wherein, in said outputting step, image data read from the storage unit is output, in response to read requests to read image data from the storage unit.

25. A method for buffer memory control, comprising the steps of:

selectively inputting image data generated by a plurality of data sources one line at a time;

temporarily storing, in a storage unit, at least one line of image data input in said inputting step;

selectively outputting the image data read from the storage unit to one of a plurality of image processing units; and controlling the number of lines of image data to be temporarily stored into the storage unit and the amount of data per line, based on the format of the image data input in said inputting step and the format of the image data output in said outputting step.

26. A buffer memory control method according to claim 25, wherein the amount of data per line of image data input in said inputting step differs for each of the plurality of data sources.

27. A buffer memory control method according to claim 25, wherein the number of lines of image data output in parallel in said outputting step differs for each of the plurality of image processing units.

28. An image processing method, comprising the steps of:

generating image data one line at a time;

temporarily storing, in a storage unit, a plurality of lines of image data generated in said generating step;

performing image processing on a plurality of lines of image data read from the storage unit; and controlling writing image data into the storage unit and/or reading therefrom, in response to a request to write image data generated in said generating step and/or a request to read image data for the image processing in said performing step, wherein the requests are granted in accordance with the number of lines of image data being stored in the storage unit.

29. An image processing method according to claim 28, wherein, in said controlling step the requests are granted in accordance with whether or not the number of lines of image data being stored in the storage unit is a predetermined number.

30. An image processing method, comprising the steps of:

generating image data of differing formats one line at a time, using a plurality of generating units;

temporarily storing, in a storage unit, at least one line of image data generated by one of the plurality of generating units;

performing image processing, using a plurality of processing units, on at least one line of image data read form the storage unit; and controlling the number of lines of image data to be temporarily stored into the storage unit and the amount of data per line, based on which of the generating units has generated the image data stored in the storage unit and which of the processing units is to perform image processing on image data read from the storage unit.

31. An image processing method according to claim 30, wherein the plurality of generating units generate image data with differing resolution.

32. An image processing method according to claim 30, wherein the plurality of processing units refer to image data with differing number of lines, to perform image processing.

33. An image processing device, comprising:

generating means for generating image data one line at a time;

storage means for temporarily storing at least one line of image data input from said input means;

processing means for performing processing on at least one line of image data read from said storage means; and control means for controlling the number of lines of image data to be temporarily stored in said storage means, in accordance with the image processing performed by said processing means.

34. An image processing device according to claim 33, wherein said control means controls the number of lines of image data to be temporarily stored in said storage means, according to the number of lines of image data to be output to said processing means.

35. An image processing device according to claim 33, further comprising reading means for reading image data from said storage means, in response to read requests to read image data from said storage means.

36. An image processing method, comprising the steps of:

generating image data one line at a time;

temporarily storing, in a storage unit, at least one line of image data generated in said generating step;

performing image processing on at least one line of image data read from the storage unit; and controlling the number of lines of image data to be temporarily stored in the storage unit, in accordance with the image processing performed in said performing step.

37. An image processing method according to claim 36, wherein said controlling step includes controlling the number of lines of image data to be temporarily stored in the storage unit, according to the number of lines of image data used for the image processing in said processing step.

38. An image processing method according to claim 36, further comprising a step of reading image data from the storage unit, in response to read requests to read image data form the storage unit.

* * * * *

UNITED STATES PATENT AND TRADEMARK OFFICE
CERTIFICATE OF CORRECTION

PATENT NO. : 6,084,686
DATED : July 4, 2000
INVENTOR(S) : KATSUTOSHI USHIDA

It is certified that error appears in the above-identified patent and that said Letters Patent is hereby corrected as shown below:

COLUMN 10

Line 22, "ill" should read --will--.

COLUMN 22

Line 20, "lines" should read --line--;
    Line 25, "precessing" should read --processing--; and
    Line 47, "form" should read --from--.

COLUMN 23

Line 49, "a" should read --an--.

COLUMN 24

Line 49, "form" should read --from--.

UNITED STATES PATENT AND TRADEMARK OFFICE
CERTIFICATE OF CORRECTION

PATENT NO. : 6,084,686

DATED : July 4, 2000

INVENTOR(S) : KATSUTOSHI USHIDA

It is certified that error appears in the above-identified patent and that said Letters Patent is hereby corrected as shown below:

<u>COLUMN 26</u>:

Line 16, "form" should read --from--.

Signed and Sealed this

Twenty-fourth Day of April, 2001

*Attest:*

NICHOLAS P. GODICI

*Attesting Officer*    Acting Director of the United States Patent and Trademark Office